US011036925B2

(12) United States Patent
Fox et al.

(10) Patent No.: US 11,036,925 B2
(45) Date of Patent: Jun. 15, 2021

(54) MANAGING THE DISTINCTIVENESS OF MULTIMEDIA

(71) Applicant: INTERNATIONAL BUSINESS MACHINES CORPORATION, Armonk, NY (US)

(72) Inventors: Jeremy R. Fox, Georgetown, TX (US); Kelley Anders, East New Market, MD (US); Jonathan D. Dunne, Dungarvan (IE); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/686,534

(22) Filed: Nov. 18, 2019

(65) Prior Publication Data

US 2021/0149989 A1 May 20, 2021

(51) Int. Cl.
*G06F 40/166* (2020.01)
*G06N 20/00* (2019.01)
*G06K 9/00* (2006.01)
*G06F 40/20* (2020.01)

(52) U.S. Cl.
CPC ............ *G06F 40/166* (2020.01); *G06F 40/20* (2020.01); *G06K 9/00744* (2013.01); *G06N 20/00* (2019.01)

(58) Field of Classification Search
CPC ... G06F 40/166; G06N 20/00; G06K 9/00744
See application file for complete search history.

(56) References Cited

U.S. PATENT DOCUMENTS

| 8,600,920 | B2 | 12/2013 | Flynn |
| 9,443,199 | B2 | 9/2016 | Pinckney |
| 9,607,264 | B2 | 3/2017 | Downs |
| 9,892,103 | B2 | 2/2018 | Manolescu |
| 10,482,183 | B1* | 11/2019 | Vargas ............... G06F 40/30 |
| 2006/0015497 | A1* | 1/2006 | Keating ............ G06F 16/5838 |
| 2010/0018560 | A1 | 1/2010 | Milano, Jr. |
| 2010/0018563 | A1 | 1/2010 | Yoshimine et al. |
| 2017/0038927 | A1 | 2/2017 | Lewis |
| 2017/0155939 | A1 | 6/2017 | Prasad |
| 2017/0185236 | A1* | 6/2017 | Yang .................. G06K 9/00671 |
| 2018/0212918 | A1 | 7/2018 | Stolorz |

OTHER PUBLICATIONS

American Psychological Association, "Distinctiveness Effect", https://dictionary.apa.org/distinctiveness-effect, printed Aug. 30, 2019, pp. 1-2.

Geraci et al., "The Orthographic Distinctiveness Effect on Direct and Indirect Tests of Memory: delineating the Awareness and Processing Requirements", Journal of Memory and Language, vol. 47, Issue 2, Aug. 2002, pp. 273-291.

(Continued)

*Primary Examiner* — Asher D Kells
(74) *Attorney, Agent, or Firm* — James W. Kappos

(57) ABSTRACT

The exemplary embodiments disclose a system and method, a computer program product, and a computer system for managing the distinctiveness of multimedia. The exemplary embodiments may include detecting an input of multimedia data, extracting one or more features from the multimedia data, and determining a distinctiveness of the multimedia based on applying one or more models to the extracted one or more features.

11 Claims, 5 Drawing Sheets

(56) References Cited

OTHER PUBLICATIONS

McDaniel et al., "Dissociative Effects of Orthographic Distinctiveness in Pure and Mixed Lists: an Item-order Account", May 2011,count, ,https://www.researchgate.net/publication/51139153, pp. 1-13.

Mell et al., "The NIST Definition of Cloud Computing", National Institute of Standards and Technology, Special Publication 800-145, Sep. 2011, pp. 1-7.

* cited by examiner

MANAGING THE DISTINCTIVENESS OF MULTIMEDIA

BACKGROUND

The exemplary embodiments relate generally to managing multimedia, and more particularly to managing the distinctiveness of multimedia.

Understanding the distinctiveness of text, images, audio, and video is beneficial for individuals and groups attempting to fit in with or stand out from others. For example, a company may wish to market a product to a group of people with a distinct slogan, distinct image, or distinct video, and may wish to understand what words, images, audio, video, etc. will be perceived by the group of people as distinct. An individual may wish to fit in with a group of people and may wish to understand what words, images, audio, video, etc. will not be perceived as distinct.

SUMMARY

The exemplary embodiments disclose a system and method, a computer program product, and a computer system for managing the distinctiveness of multimedia. The exemplary embodiments may include detecting an input of multimedia data, extracting one or more features from the multimedia data, and determining a distinctiveness of the multimedia based on applying one or more models to the extracted one or more features.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
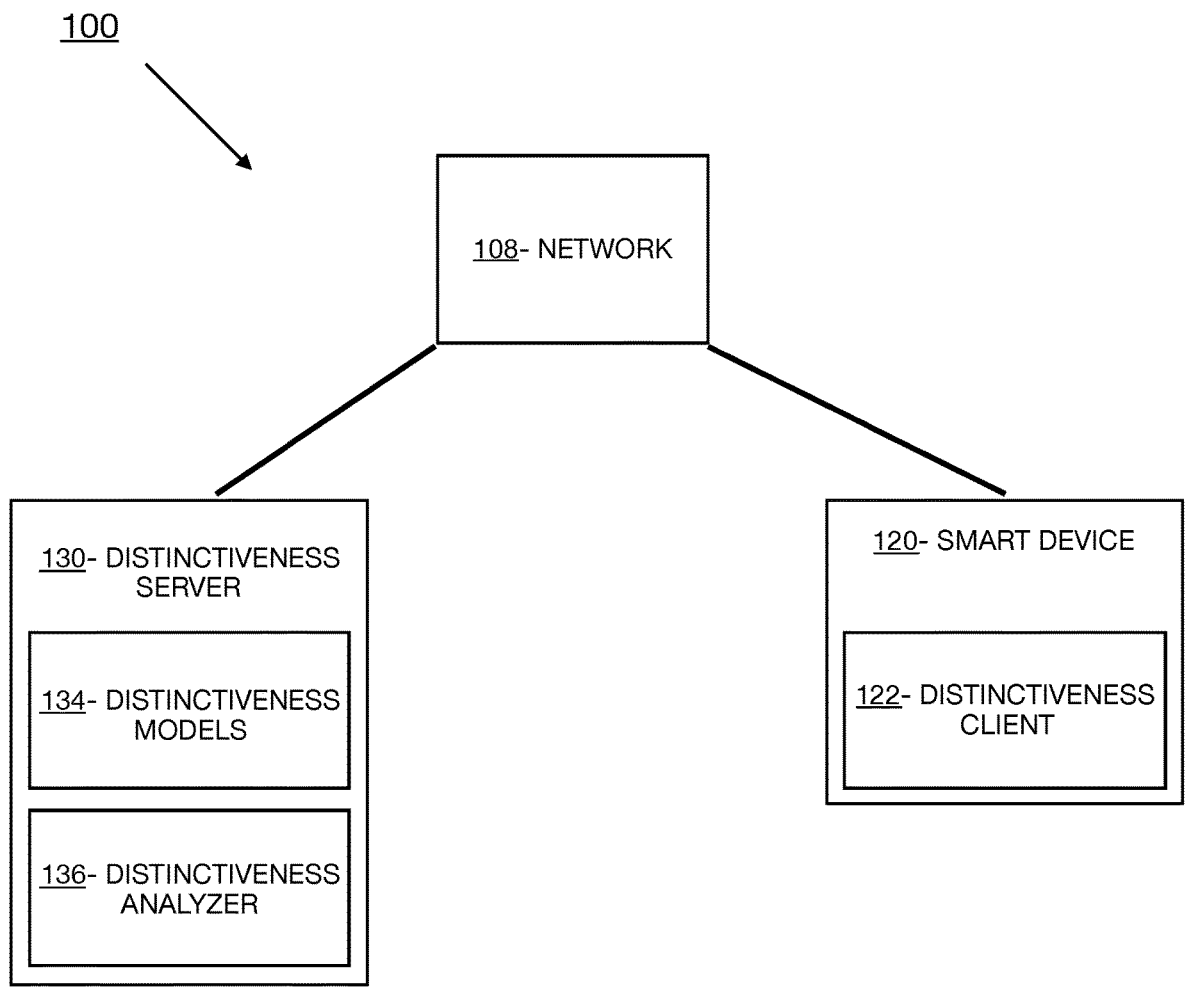
FIG. 1 depicts an exemplary schematic diagram of a distinctiveness management system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Understanding the distinctiveness of text, images, audio, and video is beneficial for individuals and groups attempting to fit in with or stand out from others. For example, a company may wish to market a product to a group of people with a distinct slogan, distinct image, or distinct video, and may wish to understand what words, images, audio, video, etc. will be perceived by the group of people as distinct. An individual may wish to fit in with a group of people and may wish to understand what words, images, audio, video, etc. will not be perceived as distinct.

Hence, an independent system is needed to address the aforementioned problem. Exemplary embodiments of the present invention disclose a method, computer program product, and computer system that will manage the distinctiveness of multimedia. Accordingly, example embodiments are directed to a system that will identify the distinctiveness of multimedia within an environment and modify the multimedia to change its perceived distinctiveness. In embodiments, audio processing, video processing, and other data processing methods may be used to identify a distinctiveness of both previously and currently curated multimedia. In particular, example embodiments may be configured for analyzing audio (e.g., speech, sounds), visual (e.g., images, facial features), and other contextual features for identifying a distinctiveness of multimedia. Use cases of embodiments described herein may relate to the management or modification of the distinctiveness of multimedia such as messages, images, audio, video, etc. for purposes such as advertising, publishing, communication, etc. In general, it will be appreciated that embodiments described herein may relate to the management of the distinctiveness of any multimedia.

FIG. 1 depicts the distinctiveness management system 100, in accordance with the exemplary embodiments. According to the exemplary embodiments, the distinctiveness management system 100 may include a smart device 120 and a distinctiveness server 130, which may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the distinctiveness management system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the example embodiment, the smart device 120 includes a distinctiveness client 122, and may be an enterprise server, laptop computer, notebook, tablet computer, netbook computer, personal computer (PC), desktop computer, server, personal digital assistant (PDA), rotary phone, touchtone phone, smart phone, mobile phone, virtual device, thin client, IoT device, or any other electronic device or computing system capable of receiving and sending data to and from other computing devices. In embodiments, the smart device 120 may be comprised of a cluster or plurality of computing devices, in a modular manner, etc., working together or working independently. The smart device 120 is described in greater detail as a hardware implementation with reference to FIG. 3, as part of a cloud implementation with reference to FIG. 4, and/or as utilizing functional abstraction layers for processing with reference to FIG. 5.

The distinctiveness client 122 may act as a client in a client-server relationship, and may be a software and/or hardware application capable of communicating with and providing a user interface for a user to interact with a server via the network 108. Moreover, in the example embodiment, the distinctiveness client 122 may be capable of transferring data from the smart device 120 to other devices via the network 108. In embodiments, the distinctiveness client 122 utilizes various wired and wireless connection protocols for data transmission and exchange, including Bluetooth, 2.4 gHz and 5 gHz Internet, near-field communication, Z-Wave, Zigbee, etc. The distinctiveness client 122 is described in greater detail with respect to FIG. 2.

In the exemplary embodiments, the distinctiveness server 130 may include one or more distinctiveness models 134 and a distinctiveness analyzer 136, and may act as a server in a client-server relationship with the distinctiveness client 122. The distinctiveness server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the distinctiveness server 130 is shown as a single device, in other embodiments, the distinctiveness server 130 may be comprised of a cluster or plurality of computing devices, working together or working independently. The distinctiveness server 130 is described in greater detail as a hardware implementation with reference to FIG. 3, as part of a cloud implementation with reference to FIG. 4, and/or as utilizing functional abstraction layers for processing with reference to FIG. 5.

The distinctiveness models 134 may be one or more algorithms modelling a correlation between one or more features extracted from received or collected data and a distinctiveness of user generated multimedia content. In the example embodiment, the distinctiveness models 134 may be generated using machine learning methods, such as neural networks, deep learning, hierarchical learning, Gaussian Mixture modelling, Hidden Markov modelling, and K-Means, K-Medoids, or Fuzzy C-Means learning, etc., and may include features such as a word count, word topic, sentence topic, sentence syntax, similar image, similar audio, similar video, etc. The distinctiveness models 134 may weight the features based on an effect that the features have on a distinctiveness of multimedia such that features determined to be more associated with the distinctiveness of multimedia are weighted more than those that are not. The distinctiveness models 134 are described in greater detail with reference to FIG. 2.

In the exemplary embodiments, the distinctiveness analyzer 136 may be a software and/or hardware program capable of receiving a configuration. The distinctiveness analyzer 136 may be further capable of collecting previously published multimedia data, extracting features from the previously published multimedia data, and applying a model to the extracted features to determine a distinctiveness of the previously published multimedia. Moreover, in some embodiments, the distinctiveness analyzer 136 may be further capable of determining a distinctiveness of currently curated user content based on applying the model to the currently curated data and modifying the multimedia to make it more or less distinct. The distinctiveness analyzer 136 may further evaluate and modify the distinctiveness models 134. The distinctiveness analyzer 136 is described in greater detail with reference to FIG. 2.

Figure 2:
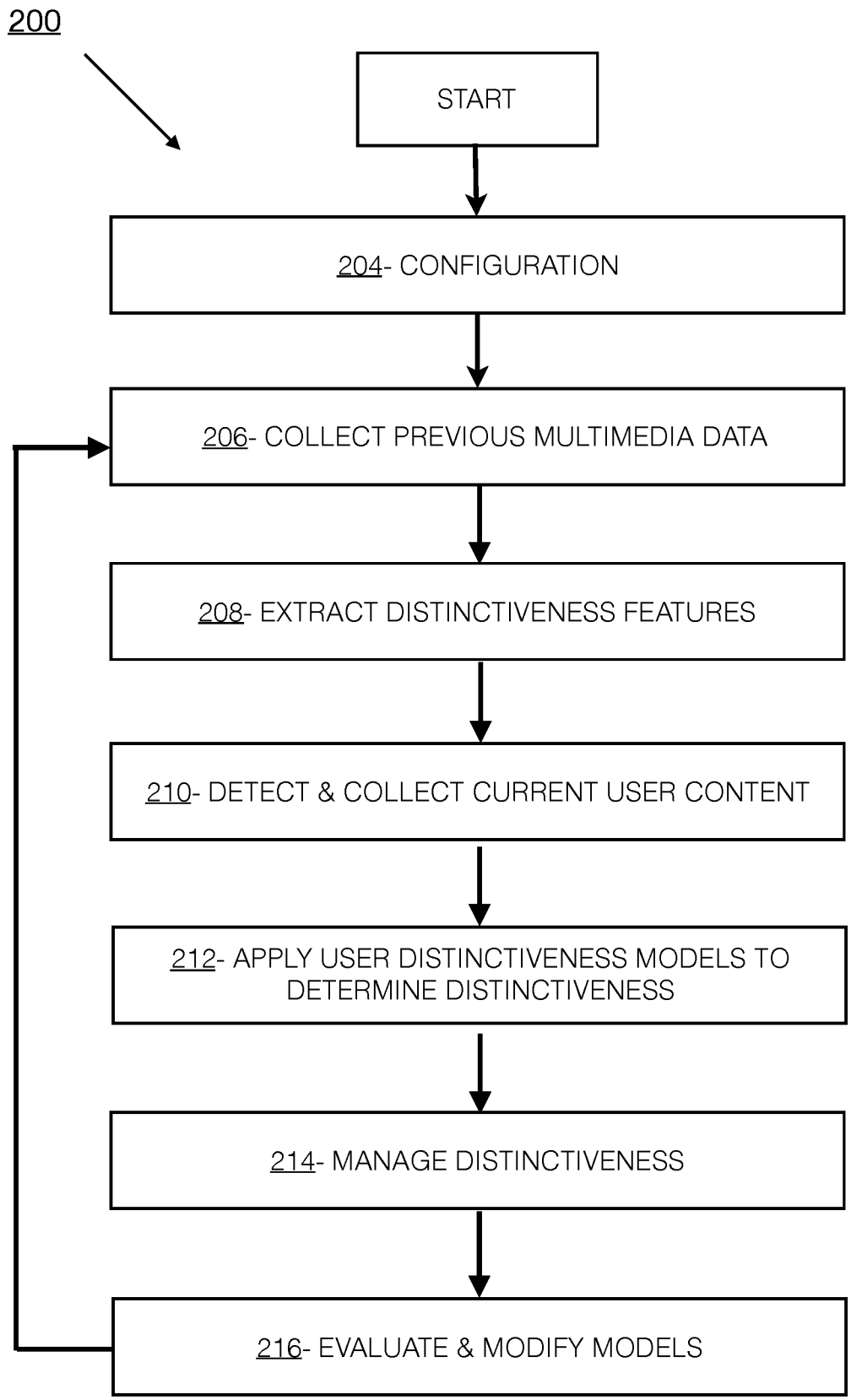
FIG. 2 depicts an exemplary flowchart 200 illustrating the operations of a distinctiveness analyzer 136 of the distinctiveness management system 100 in managing the distinctiveness of multimedia, in accordance with the exemplary embodiments.

FIG. 2 depicts an exemplary flowchart 200 illustrating the operations of the distinctiveness analyzer 136 of the distinctiveness management system 100 in managing the distinctiveness of multimedia, in accordance with the exemplary embodiments.

The distinctiveness analyzer 136 may receive a configuration (step 204). The distinctiveness analyzer 136 may be configured by receiving information such as a user registration. The user registration may be uploaded by a user or administrator, i.e., the owner of the smart device 120 or the administrator of smart device 120. For example, the administrator may be an owner/user of the device, a guardian of a minor who uses the device, an employer of a phone-provided employee, etc. A user registration may include data from databases such as a name, age, gender, location, industry, interests, education, hobbies, and any other information relevant to the user and user multimedia content generation. This information may be extracted from, for example, social networks, employee registries/databases, calendars/schedules, etc. In the example embodiment, the configuration may be received by the distinctiveness analyzer 136 via the distinctiveness client 122 and the network 108.

To further illustrate the operations of the distinctiveness analyzer 136, reference is now made to an illustrative example where a user uploads a user registration with a link to a user profile database containing the name, age, and industry of the user.

The distinctiveness analyzer 136 may receive or collect previous multimedia data from a user (step 206). The previous multimedia may be in the form of text, image, audio, video, gif, etc. and received via user input, multimedia link/reference (e.g., linking a social media platform or blog post), or collected by various sensors such as a keyboard, microphone, video camera, and the like. Collected previous multimedia may include message history, social media posts, sent or received audio, sent or received video, likes/dislikes, shares, etc. This information may be extracted from, for example, social networks, employee registries/databases, calendars/schedules, etc. In some embodiments, the distinctiveness analyzer 136 may prompt the user to upload previous multimedia by playing a recorded or automated audio, video, text, etc. message. The message may be pre-recorded and available by default or personalized by the user. For example, the distinctiveness analyzer 136 may play the recorded message, "Please upload previous multimedia for distinctiveness analysis."

With reference again to the previously introduced example where the distinctiveness analyzer 136 receives the registration of the user, the distinctiveness analyzer 136 receives previous user multimedia data via reference to a database that includes internet blogs, public posts within a social media network, and a personal messaging history of a messaging application.

The distinctiveness analyzer 136 may extract features from the collected and received previous multimedia and other data (step 208). Such features may be extracted from data such as message history, social media posts, sent or received images, audio, or video, etc. in social networks, employee registries/databases, calendars/schedules, etc., and the features may include those relating to distinctiveness of content, such as a word count, word topic, sentence topic, sentence syntax, similar image, similar audio, similar video, etc.

The distinctiveness analyzer 136 may extract a word count from the collected and received multimedia data by counting the number of words in a user's message history, social media posts, etc. (step 208 continued). In embodiments, the distinctiveness analyzer 136 may determine a word count based on models such as a bag of words model. Bag of words models determine the numbers of words within a sentence without regard to syntax or grammar. For example, the distinctiveness analyzer 136 may determine a word count for each word in the collected multimedia using a bag of words model where the distribution of the words in a user's message history, social media posts, etc. is analyzed as a bar graph with words of the multimedia on the x-axis and numbers of occurrence throughout collected data on the y-axis. It will be appreciated that in embodiments, the distinctiveness analyzer 136 may use other methods and techniques to determine features such as word count within the collected previous multimedia.

In addition to a word count, the distinctiveness analyzer 136 may further extract other features such as a word topic or sentence topic from the collected and received multimedia and other data (step 208 continued). The distinctiveness analyzer 136 may extract features such as a word topic or sentence topic based on models such as a topic model, latent dirichlet analysis model, or biterm topic model. The distinctiveness analyzer 136 may use one or more of these models to determine the correlation of individual words, groups of words, sentences, etc. to particular topics. For example, the distinctiveness analyzer 136 may determine that words in a collected multimedia such as "woof," "bark," "tug," and "fetch" correlate to topic "dog," and words in a collected multimedia such as "meow," "hairball," and "purr" correlate to topic "cat." Similarly, the distinctiveness analyzer 136 may determine that the sentence, "Go fetch the ball, dog!" has topic "dog" while the sentence, "The cat meowed softly" has topic cat. The distinctiveness analyzer 136 may express a number of occurrences for a word topic or sentence topic in the form of a number, and/or may express numbers of occurrences for more than one word topic or sentence topic with a bar graph with word or sentence topics of the multimedia on the x-axis and numbers of occurrences throughout collected data on the y-axis. For example, the distinctiveness analyzer 136 may determine that the multimedia, "Go pet the dog!," "Can I pet your dog?," and "That dog is so cute," all have sentence topic dog, and that the sentence topic dog has 3 occurrences.

In addition to a word topic or sentence topic, the distinctiveness analyzer 136 may further extract other features such as a sentence syntax from the collected and received multimedia and other data (step 208 continued). The distinctiveness analyzer 136 may extract features such as a sentence syntax based on models such as a cosine similarity model, word mover's distance model, or other template matching models. In embodiments, cosine similarity may determine a similarity between a sentence and a syntax or sentence structure by modelling multimedia sentences as vectors and determining cosine values between them. In such embodiments, multimedia sentences with higher cosine values may be treated as having similar sentence syntax, while multimedia sentences with lower cosine values may be treated as having different sentence syntax. In some embodiments, the distinctiveness analyzer 136 may determine sentence syntax based on a word mover's distance model by determining the sum of distances between sentences in collected multimedia. The distinctiveness analyzer 136 may use one or more of these models to determine the correlation of sentences to particular syntaxes. The distinctiveness analyzer 136 may express a number of occurrences of a sentence syntax in the form of a number, and/or may express the numbers of occurrences of more than one sentence syntaxes with a bar graph with sentence syntaxes of the multimedia on the x-axis and numbers of occurrences throughout collected data on the y-axis. For example, the distinctiveness analyzer 136 may compare the multimedia sentence, "Mike threw the football" to other sentences in received or collected data with similar syntax or sentence structure such as "John hit the ball," "Jim passed the ketchup," and "Amy ate the pizza," to determine that the four sentences have similar sentence syntax and that the sentence syntax has 4 occurrences.

In addition to a sentence syntax, the distinctiveness analyzer 136 may further extract other features such as a similar image, audio, and/or video from the collected and received multimedia and other data (step 208 continued). The distinctiveness analyzer 136 may extract a similar image based on various image analysis models and/or techniques, such as 2D and 3D object recognition, image segmentation, motion detection (single particle tracking), video tracking, optical flow, medical scan analysis, 3D pose estimation, and automatic number plate recognition. The distinctiveness analyzer 136 may extract a similar audio based on comparing audio characteristics such as topic, wavelength, amplitude, time period, frequency, velocity of wave, etc. The distinctiveness analyzer 136 may transcribe collected audio and utilize various text analysis models to determine audio content similarity and/or techniques as previously described, such as bag of words models, topic models, latent dirichlet analysis models, biterm topic models, cosine similarity models, word mover's distance models, or other template matching models. The distinctiveness analyzer 136 may extract a similar video based on comparing video characteristics such as topic, frames per second, interlaced vs. progressive, aspect ratio, color model and depth, video quality, video compression method, analog, stereoscopic, etc. The distinctiveness analyzer 136 may analyze images of a video using image analysis models and/or techniques as previously discussed. The distinctiveness analyzer 136 may additionally transcribe audio from a collected video and utilize various text analysis models as discussed above. The distinctiveness analyzer 136 may express a number of occurrences of similar image, audio, and/or video in the form of a number, and/or may express the numbers of occurrences of more than one type of image, audio, and/or video with a bar graph with types of images, audio, and/or video of the multimedia on the x-axis and numbers of occurrences throughout collected data on the y-axis.

With reference to the example above wherein the distinctiveness analyzer 136 receives previous multimedia data from a message history database, the distinctiveness analyzer 136 uses a bag of words model, topic model, and template matching model to determine that the user frequently creates multimedia content with the word "good" and with the sentence syntax, "The _____ _____ is in _____".

The distinctiveness analyzer 136 may detect and collect current user content from a user (step 210). Current user content may be detected, for example, as a user is entering text into a text field or attaching an audio, image, or video file to a document. The distinctiveness analyzer 136 may detect the user content via techniques described above, and the content may include text, audio, image, video, etc. In addition to detecting the current user multimedia content, the distinctiveness analyzer 136 may further receive inputs such as a previous time period or window from which to consider past multimedia content, a target multimedia audience, and an intended distinctiveness. For example, a user may wish to compare distinctiveness of current content to only a particular, previous time period. In some embodiments, the intended distinctiveness analyzer 136 may receive these inputs in natural language, e.g., "distinct," while in other embodiments, the distinctiveness analyzer 136 may receive an intended distinctiveness in numeric scales, e.g., distinctiveness of 9. Moreover, the target multimedia audiences may include an indication of target audience based on age, gender, industry, location, interest, hobby, etc. In some embodiments, the distinctiveness analyzer 136 may prompt the user to upload previous multimedia by playing a recorded or automated audio, video, text, etc. message. The message may be pre-recorded and available by default or personalized by the user. For example, the distinctiveness analyzer 136 may play the recorded message, "Please upload current multimedia for distinctiveness analysis."

With reference again to the previously introduced example where the distinctiveness analyzer 136 receives a user registration, the distinctiveness analyzer 136 detects the user typing a message, "Pizza is good. The best pizza is in Italy." into the text field of an online blog with inputs of previous time window: January, 2018 until March, 2018, audience: food enthusiasts, and intended distinctiveness: distinct.

The distinctiveness analyzer 136 may extract features from the received or collected current multimedia using methods described above, compare the features to the extracted features from received or collected previous multimedia, and apply one or more models to the compared features (step 212). In embodiments, the distinctiveness analyzer 136 may compare features of the current multimedia with features of the previous multimedia by identifying like features, or lack thereof, and comparing values thereof. In embodiments, the current multimedia features and/or previous multimedia features may be numeric values that are added, subtracted, etc. to determine a compared feature. In embodiments, the distinctiveness analyzer 136 may apply the one or more distinctiveness models 134 to the compared features to compute a distinctiveness score. As previously mentioned, such compared features may include a word count, word topic, sentence topic, sentence syntax, similar image, similar audio, similar video, etc., and the one or more distinctiveness models 134 may be generated through machine learning techniques such as neural networks.

Moreover, the distinctiveness analyzer 136 may weight the extracted and compared features (step 212 continued). In embodiments, the one or more distinctiveness models 134 may be trained at initialization and/or through the use of a feedback loop to weight the compared features such that features shown to have a greater correlation with multimedia distinctiveness are weighted greater than those features that are not. Such weighting may be accomplished through machine learning techniques such as neural networks, hierarchical learning, or regularization. Such techniques may assign weights to the features that are trained and modified through use of a feedback loop indicative of whether managed multimedia was perceived to be distinct and which features were most relied upon in the management of the multimedia. The feedback loop is described in greater detail below. In some embodiments, the compared features may be numeric values that are multiplied by the numeric weighting values associated with said compared features by the distinctiveness models 134. The sum of the multiplication of said compared feature values and weighting values may result in numeric values representing scores for the current multimedia indicative of its distinctiveness.

With reference again to the previously introduced example where the distinctiveness analyzer 136 receives current multimedia from the user in the form of a text message: "Pizza is good. The best pizza is in Italy." with inputs of previous time window: January, 2018 until March, 2018, audience: food enthusiasts, and intended distinctiveness: distinct, the distinctiveness analyzer 136 extracts word count, word topic, sentence topic, and sentence syntax features (high word count for "good" and high sentence syntax count for "The is in") and applies the distinctiveness models 134 to the compared features to compute a distinctiveness score of 87.

The distinctiveness analyzer 136 may manage the distinctiveness of multimedia (step 214). The distinctiveness analyzer 136 may manage a multimedia's distinctiveness by determining the distinctiveness of and/or modifying the multimedia. In some embodiments, a multimedia's score may be below a threshold value, and the distinctiveness analyzer 136 may determine that the multimedia is distinct. Conversely, a multimedia's score may be above a threshold value, and the distinctiveness analyzer 136 may determine that the multimedia is not distinct. In some embodiments, the distinctiveness analyzer 136 may simply notify the user of its determination of whether the multimedia is distinct or not. In other embodiments, the distinctiveness analyzer 136 may modify or suggest modifications to the multimedia to make the multimedia more or less distinct, depending on a user's input. The distinctiveness analyzer 136 may make modifications to the multimedia using models and analysis techniques described above to determine alternative words, word or sentence topics, synonyms, antonyms, sentence syntaxes, images, audio, video etc. that would make the multimedia more or less distinct while still conveying a same or similar meaning. In embodiments, the distinctiveness analyzer 136 may simply utilize words, sentence topics, sentence syntaxes, images, audio, video, etc. that were the least used in the previous multimedia (e.g. the features with low scores) while replacing words via reference to synonyms, replacing sentence syntax using different patterns having a same meaning, and changing sentence, paragraph, etc. topic based on a topic model that details topics and subtopics in a hierarchical tree. In embodiments, the features to be replaced or modified in this step may be a configurable option. For example, if the distinctiveness analyzer 136 receives intended distinctiveness "distinct" and current multimedia with score 75 (above threshold 50) that is not distinct, the distinctiveness analyzer 136 may modify the current multimedia to include words with low previous multimedia word count values and sentence syntaxes with low previous multimedia sentence syntax values such that the distinctiveness analyzer 136 determines the modified current multimedia to have score 49 (below threshold 50) and to be distinct. In other embodiments, the distinctiveness analyzer 136 may generate alternative words, sentences, syntaxes, etc. using resources such as natural language processing/understanding, dictionaries, lexicons, grammatical rules, machine learning techniques, etc.

With reference again to the previously introduced example where the distinctiveness analyzer 136 receives current multimedia from the user in the form of a text message: "Pizza is good. The best pizza is in Italy." with inputs of previous time window: January, 2018 until March, 2018, audience: food enthusiasts, and intended distinctiveness: distinct, and computes a multimedia score of 87 (above threshold 50), the distinctiveness analyzer 136 modifies the multimedia to "Pizza is delicious. Pizza tastes the best in Italy." with a modified multimedia score of 49 (below threshold 50).

The distinctiveness analyzer 136 may evaluate and modify the models (step 216). In the example embodiment, the distinctiveness analyzer 136 may verify whether modified multimedia is perceived as distinct in order to provide a feedback loop for modifying the distinctiveness models 134. In embodiments, the feedback loop may simply provide a means for a user or administrator to indicate whether the modified multimedia was in fact more or less distinct than the collected multimedia. For example, the distinctiveness analyzer 136 may prompt a user to select an option indicative of whether modified multimedia was more or less distinct than the collected multimedia. The option may comprise a toggle switch, button, slider, etc. that may be selected by the user manually by hand using a button/touchscreen/etc., by voice, by eye movement, and the like. Based on the distinctiveness analyzer 136 properly or improperly modifying the distinctiveness of multimedia, the distinctiveness analyzer 136 may modify the distinctiveness models 134. In other embodiments, the distinctiveness analyzer 136 may infer or deduce whether modified multimedia was more or less distinct. For example, if the user inputted intended distinctiveness "distinct" and immediately circulates/distributes the modified multimedia, the distinctiveness analyzer 136 may infer that the modified multimedia was properly modified to be more distinct. Moreover, the distinctiveness analyzer 136 may infer distinctiveness based on user inputs of multimedia consumers, such as likes or reshares of the user generated content. In addition, the distinctiveness analyzer 136 may interpret user dialogue collected from various sensors via natural language processing to determine whether multimedia was modified properly. For example, if the user says, "Yes, that's better," then the distinctiveness analyzer 136 may identify the modification as proper and adjust the distinctiveness models 134. Based on feedback received in the above or any other manners, the distinctiveness analyzer 136 may then modify the distinctiveness models 134. In addition to modifying the distinctiveness models 134, the distinctiveness analyzer 136 may add the original and/or modified multimedia (now previous multimedia data) to the previous multimedia data collected above to be used for a future iteration. For example, if the user confirms that the modified multimedia was properly modified to be more distinct, the distinctiveness analyzer 136 may treat the modified multimedia as previous multimedia for a future iteration.

With reference again to the previously introduced example where the distinctiveness analyzer 136 modified the collected multimedia to "Pizza is delicious. Pizza tastes the best in Italy", the user indicates by pressing a button that the multimedia modification properly made the collected current multimedia more distinct, and the distinctiveness analyzer 136 adjusts the distinctiveness models 134.

Figure 3:
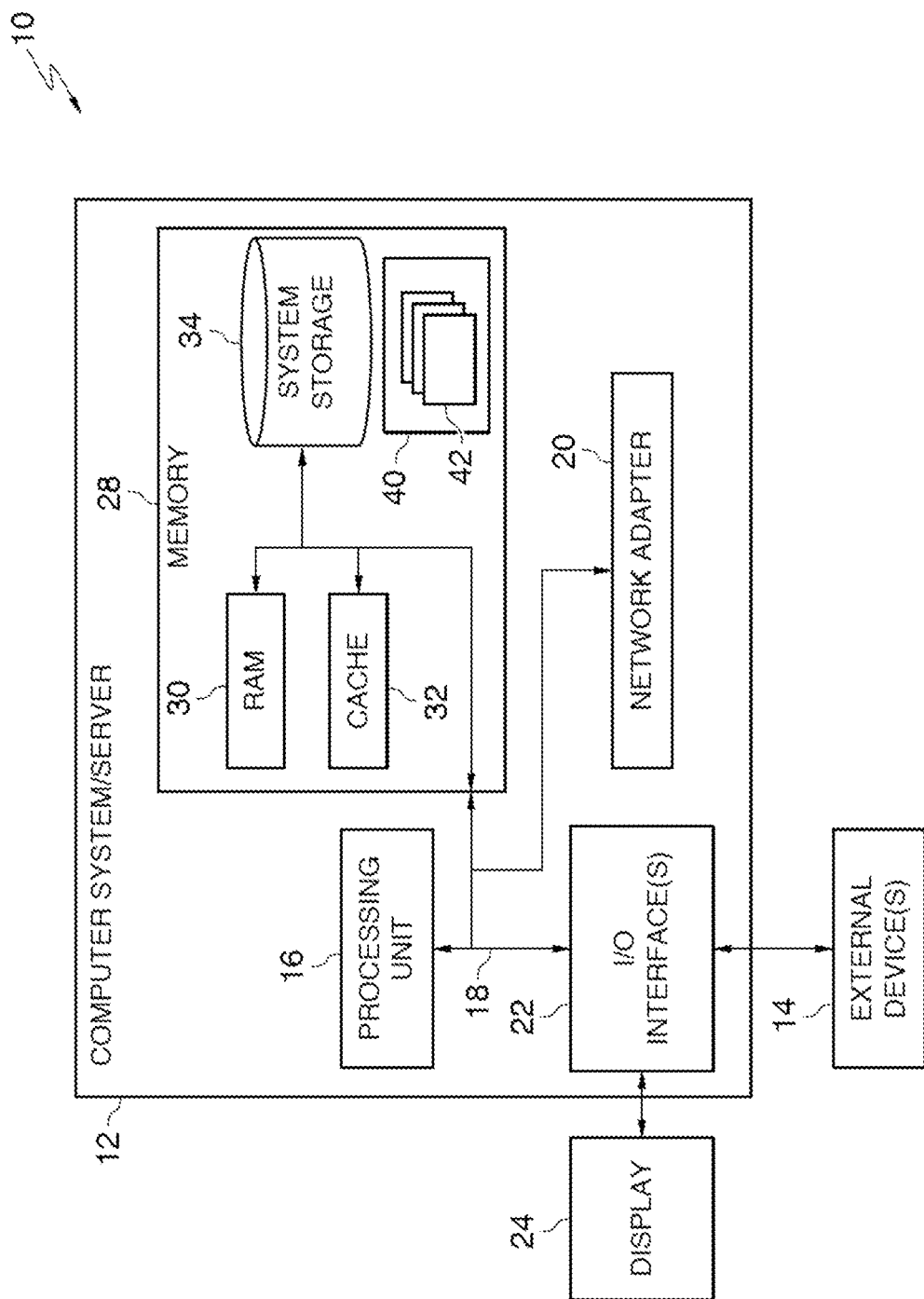
FIG. 3 depicts an exemplary block diagram depicting the hardware components of the distinctiveness management system 100 of FIG. 1, in accordance with the exemplary embodiments.

FIG. 3 depicts a block diagram of devices within the distinctiveness analyzer 136 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
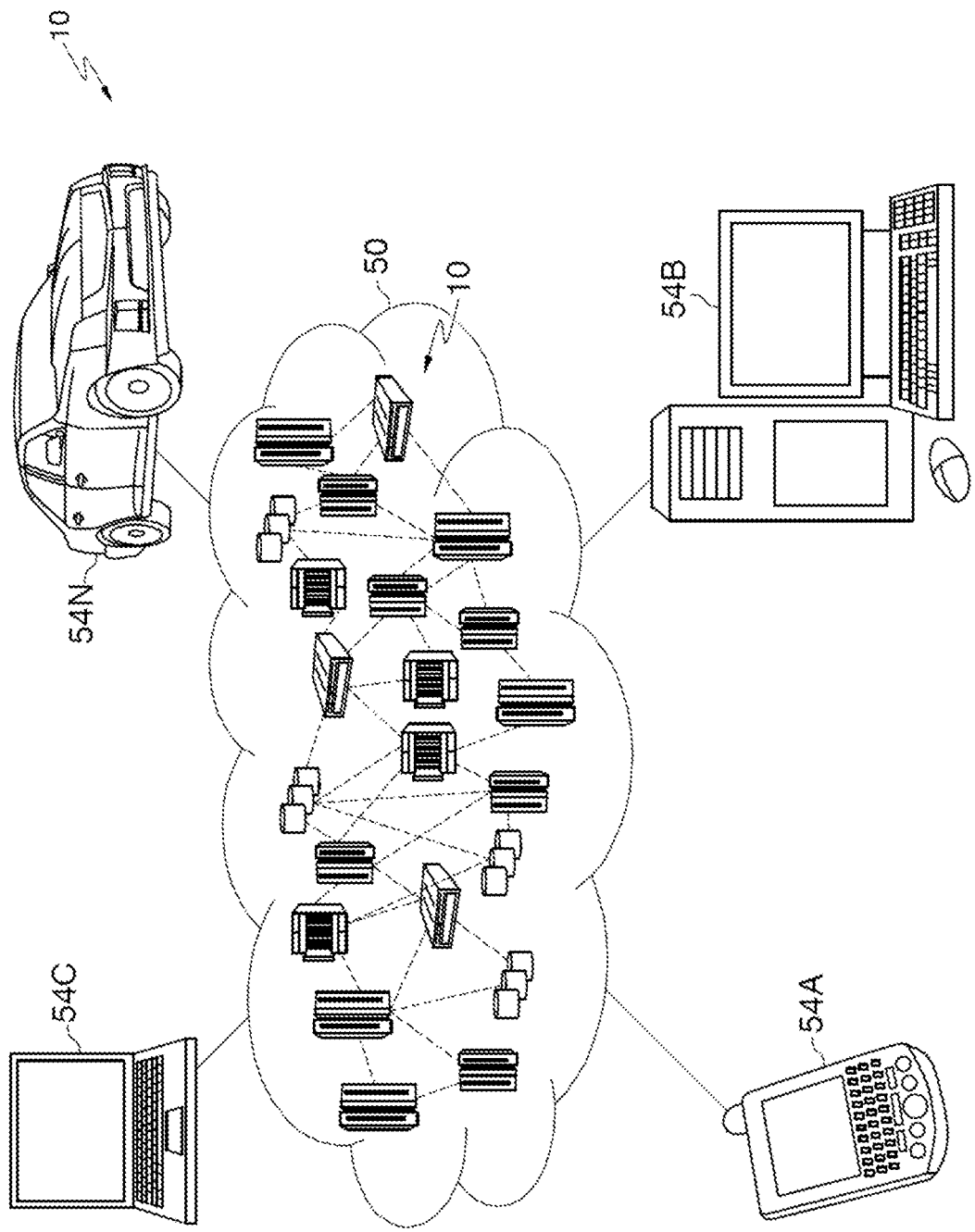
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
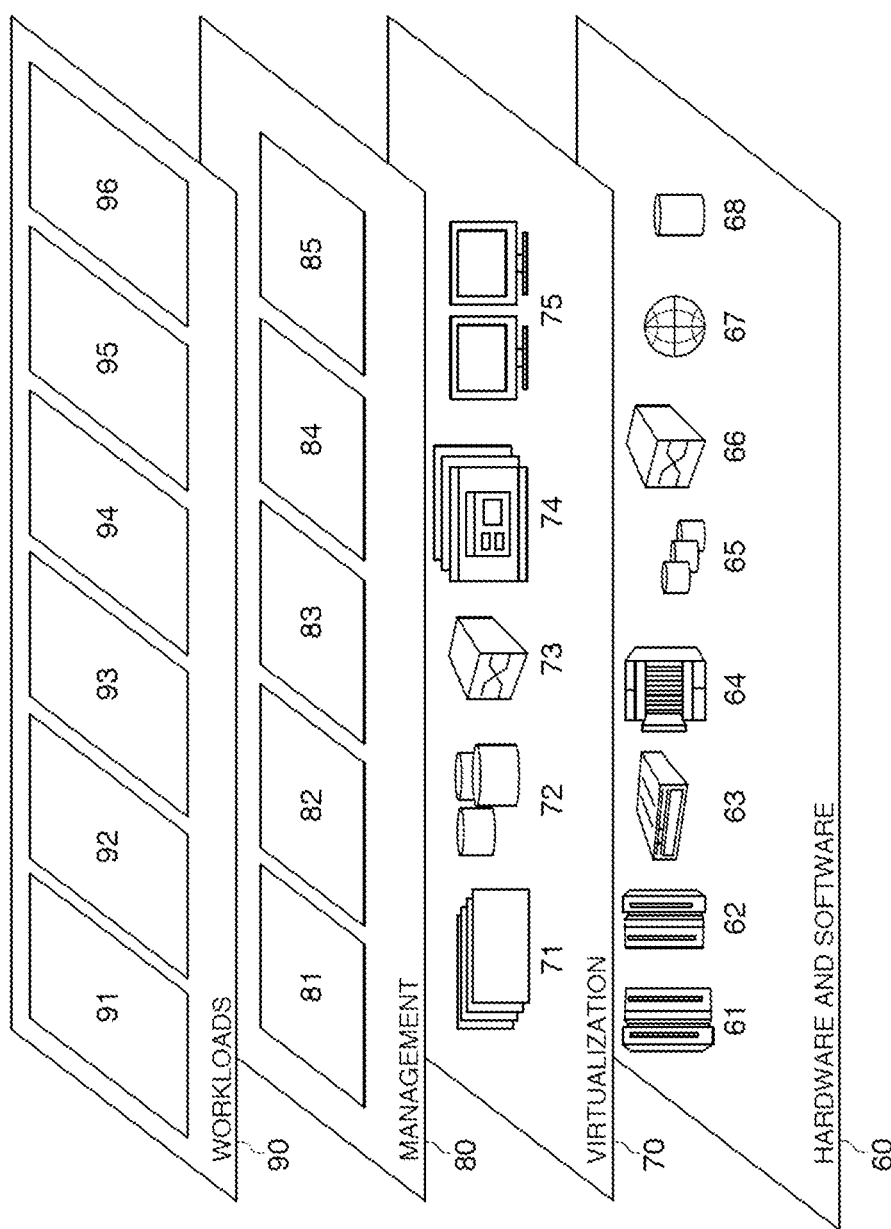
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distinctiveness management 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for managing the distinctiveness of multimedia, the method comprising:
    detecting an input of multimedia data;
    extracting one or more features from the multimedia data;
    determining a distinctiveness of the multimedia based on applying one or more models to the extracted one or more features, wherein the one or more models are generated by extracting the one or more features from historic multimedia data, labelling the distinctiveness of the historic multimedia data, and generating the one or more models based on the labels and the one or more extracted features;
    electronically notifying a user of the determined distinctiveness;
    based on determining that the distinctiveness of the multimedia does not exceed a threshold, modifying the multimedia to modify the distinctiveness of the multimedia;
    receiving feedback indicative of whether the modification to the multimedia has modified a distinctiveness of the modified multimedia; and
    adjusting the one or more models based on the received feedback.

2. The method of claim 1, wherein the one or more models correlate the one or more features with the distinctiveness of the multimedia.

3. The method of claim 1, wherein modifying the multimedia further comprises:
    replacing the one or more features of the multimedia.

4. The method of claim 1, wherein the one or more features include features selected from a group comprising a word count, word topic, sentence topic, sentence syntax, similar image, similar audio, and similar video.

5. A computer program product for managing the distinctiveness of multimedia, the computer program product comprising:
    one or more non-transitory computer-readable storage media and program instructions stored on the one or more non-transitory computer-readable storage media capable of performing a method, the method comprising:
    detecting an input of multimedia data;
    extracting one or more features from the multimedia data;
    determining a distinctiveness of the multimedia based on applying one or more models to the extracted one or more features, wherein the one or more models are generated by extracting the one or more features from historic multimedia data, labelling the distinctiveness of the historic multimedia data, and generating the one or more models based on the labels and the one or more extracted features;
    electronically notifying a user of the determined distinctiveness;
    based on determining that the distinctiveness of the multimedia does not exceed a threshold, modifying the multimedia to modify the distinctiveness of the multimedia;
    receiving feedback indicative of whether the modification to the multimedia has modified a distinctiveness of the modified multimedia; and adjusting the one or more models based on the received feedback.

6. The computer program product of claim 5, wherein the one or more models correlate the one or more features with the distinctiveness of the multimedia.

7. The computer program product of claim 5, wherein modifying the multimedia further comprises:
replacing the one or more features of the multimedia.

8. The computer program product of claim 5, wherein the one or more features include features selected from a group comprising a word count, word topic, sentence topic, sentence syntax, similar image, similar audio, and similar video.

9. A computer system for managing the distinctiveness of multimedia, the computer system comprising:
one or more computer processors, one or more computer-readable storage media, and program instructions stored on the one or more of the computer-readable storage media for execution by at least one of the one or more processors capable of performing a method, the method comprising:
detecting an input of multimedia data;
extracting one or more features from the multimedia data;
determining a distinctiveness of the multimedia based on applying one or more models to the extracted one or more features, wherein the one or more models are generated by extracting the one or more features from historic multimedia data, labelling the distinctiveness of the historic multimedia data, and generating the one or more models based on the labels and the one or more extracted features;
electronically notifying a user of the determined distinctiveness;
based on determining that the distinctiveness of the multimedia does not exceed a threshold, modifying the multimedia to modify the distinctiveness of the multimedia;
receiving feedback indicative of whether the modification to the multimedia has modified a distinctiveness of the modified multimedia; and
adjusting the one or more models based on the received feedback.

10. The computer system of claim 9, wherein the one or more models correlate the one or more features with the distinctiveness of the multimedia.

11. The computer system of claim 9, wherein modifying the multimedia further comprises:
replacing the one or more features of the multimedia.

* * * * *